United States Patent
Wadleigh

(10) Patent No.: US 6,367,738 B1
(45) Date of Patent: Apr. 9, 2002

(54) AEROBATIC AIRCRAFT

(76) Inventor: John Wadleigh, 4841 E. Salida Del Sol Pl., Tucson, AZ (US) 85718

( * ) Notice: Subject to any disclaimer, the term of this patent is extended or adjusted under 35 U.S.C. 154(b) by 0 days.

(21) Appl. No.: 09/494,710

(22) Filed: Jan. 31, 2000

(51) Int. Cl.[7] .............................................. B64C 39/02
(52) U.S. Cl. ........................ 244/13; 244/45 R; 244/55
(58) Field of Search ......................... 244/13, 15, 45 R, 244/55, 89; D12/335, 339, 344

(56) References Cited

U.S. PATENT DOCUMENTS

| | | | | |
|---|---|---|---|---|
| 1,874,523 | A | * 8/1932 | Henrichsen et al. | |
| D97,652 | S | * 11/1935 | Swanson | |
| 2,140,783 | A | * 12/1938 | Bellanca | |
| D113,019 | S | * 1/1939 | Silverstein | |
| D130,651 | S | * 12/1941 | Silverstein | |
| D239,522 | S | * 4/1976 | Wheatley | |
| 4,089,493 | A | 5/1978 | Paulson | 244/135 R |
| 4,240,598 | A | 12/1980 | Vinas Espin et al. | 244/35 R |
| 4,447,022 | A | 5/1984 | Lion | 244/13 |
| 4,531,358 | A | * 7/1985 | Smith | |
| 4,565,530 | A | 1/1986 | Espenhain | 440/18 |
| 4,643,639 | A | 2/1987 | Caine | 415/148 |
| 4,998,995 | A | * 3/1991 | Blythe | |
| 5,076,516 | A | 12/1991 | Wheat et al. | 244/154 |
| 5,086,993 | A | * 2/1992 | Wainfan | 244/48 |
| 5,520,355 | A | * 5/1996 | Jones | 244/13 |
| 5,782,427 | A | * 7/1998 | Hermach | |
| 5,850,990 | A | 12/1998 | Gevers | 244/105 |

OTHER PUBLICATIONS

The AOPA Pilot, "Stay twin proficient and still have time to swing", May 1970, 1 page.

* cited by examiner

*Primary Examiner*—Galen L. Barefoot
(74) *Attorney, Agent, or Firm*—Hayes, Soloway, Hennessey, Grossmann & Hage, P.C.; Dale F. Regelman

(57) ABSTRACT

An improved aerobatic aircraft design having a first engine located in the nose portion of the fuselage and a second engine located in the tail portion of the fuselage. The thrust components of both the first and second engines are coaxial along the long axis of the fuselage. Both engines can individually provide sufficient power for the aircraft to takeoff, maintain altitude, and/or land.

17 Claims, 7 Drawing Sheets

AEROBATIC AIRCRAFT

FIELD OF THE INVENTION

The present invention relates to an improved aerobatic aircraft which utilizes two engines, where one engine is located in the nose portion of the fuselage and the second engine is located in the tail portion of the fuselage.

BACKGROUND OF THE INVENTION

Conventional aerobatic aircraft utilize a variety of aircraft designs and engine designs. For example, aerobatic aircraft designed by Curtis Pitts are single engine, biwing aircraft using tube/fabric construction. The Beech T 34A Mentor is a single engine, low wing, all metal, monoplane. The Decathlons are tube/fabric aircraft with strut-braced high wings. The Russian YAK-52 utilizes a single radial piston engine. Although these prior art aerobatic aircraft utilize a variety of wing designs, engine designs, and construction techniques, they all utilize a single engine.

A critical parameter in the performance of an aerobatic aircraft is its power to weight ratio. In order to perform vertical aerobatic maneuvers, an acrobatic aircraft necessarily needs to have available a large amount of power. An aircraft engine's power output increases as the number of cylinders and the size of those cylinders increase. A practical limit is reached, however, because an incremental percentage increase in engine power requires a greater incremental percentage increase in the engine's weight. Thus, increasing an acrobatic aircraft's power by using a larger engine results in a decreased power loading, i.e. horsepower per pound.

It is known in the art to use power from a turbine engines drive to turn a propeller. Although these "turboprop" combinations can achieve greater horsepower for a given weight than can piston engines, these turboprop powerplants do not fare well in aerobatic aircraft use. Such aircraft have acceptable vertical flight capabilities. However, such powerplants give unacceptable snap maneuvers due to their circular engine mounts.

What is needed is an aerobatic aircraft having increased power but a reduced power loading. Such an improved acrobatic aircraft would have both enhanced vertical maneuver capability and enhanced snap maneuver capability. Unlike prior art aerobatic aircraft, Applicant's invention utilizes a twin engine design with the first engine located in the nose portion of the aircraft's fuselage and the second engine located in the tail portion of the fuselage. Using this configuration, greater horsepower is available without sacrificing aircraft aerobatic performance.

SUMMARY OF THE INVENTION

Applicants' novel invention comprises an improved aerobatic aircraft design which utilizes two engines. A first engine is disposed with the nose portion of the fuselage and a second engine is disposed within the tail portion of that fuselage. Each engine has sufficient power to safely allow the aircraft to takeoff, maintain altitude, and land. Therefore, even if one engine were to fail during takeoff, Applicant's aerobatic aircraft would have sufficient power to continue that takeoff, safely navigate the traffic pattern, and safely land.

In addition, the thrust components of the two engines are coaxial along the long axis of the fuselage. Therefore, in the unlikely event one engine fails in flight, there is no change in the direction of the resulting thrust vector. Thus, even if an engine were to fail during an aerobatic maneuver, the pilot could safely complete that aerobatic maneuver, and then safely return to an airport and safely land. Applicant's invention further includes an oil system which operates in any aircraft orientation, i.e. upright, inverted, or vertical. This oil system uses two oil pumps which receive oil from opposite sides of the engines.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Applicant's invention is low wing, aerobatic aircraft. The subject aircraft can be certified in the aerobatic category at up to about +/-10 g's. In a first embodiment, Applicant's invention is a single place aircraft. In a second embodiment, Applicant's invention can seat two persons side by side. In a separate embodiment, Applicant's aircraft can accommodate two persons sitting in tandem.

Figure 1:
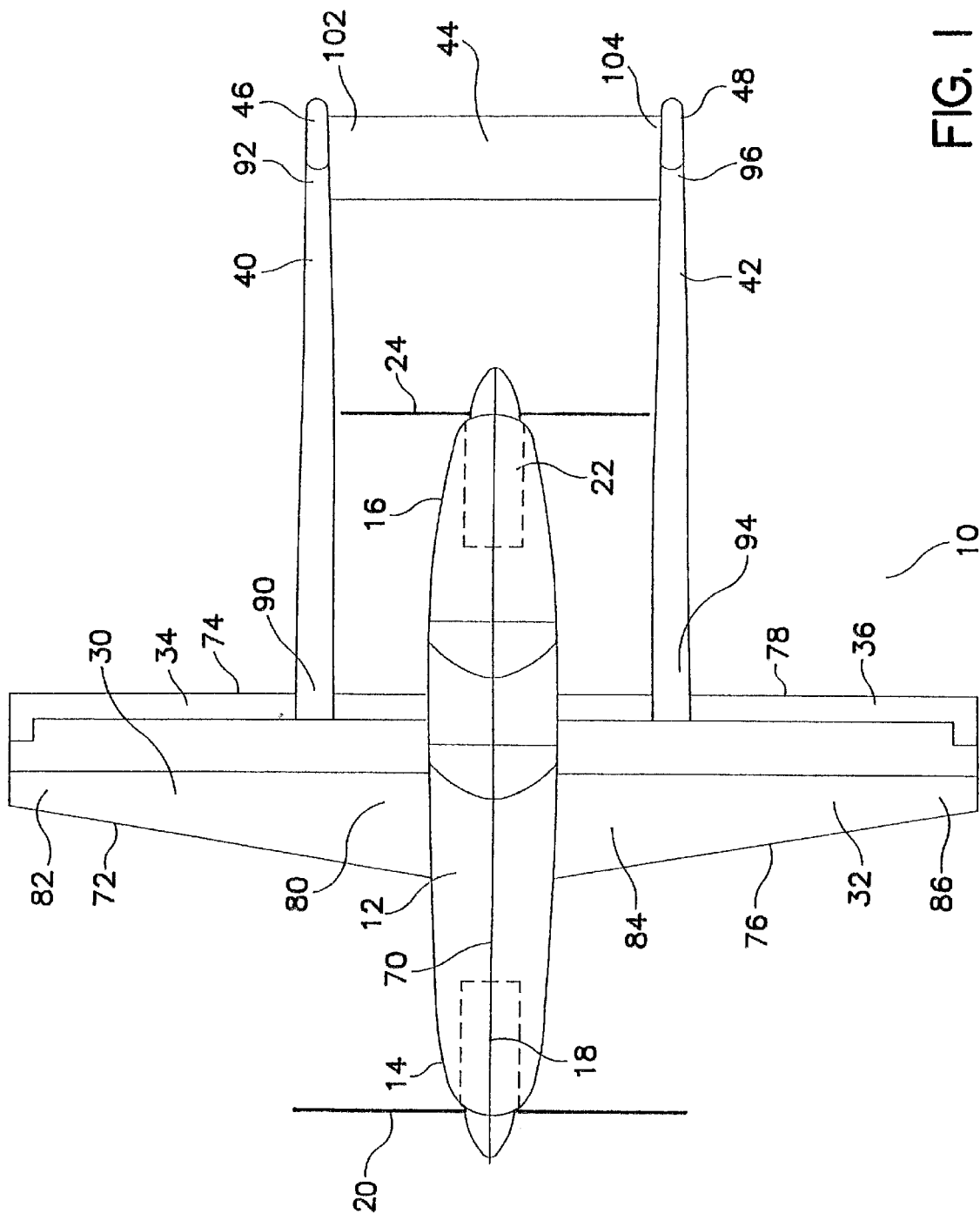
FIG. 1 is a top down view of Applicant's invention.

Turning to FIG. 1, Applicant's aerobatic aircraft 10 includes fuselage 12. Fuselage 12 has a nose portion 14 and a tail portion 16. The long axis 70 of fuselage 12 runs from nose portion 14 to tail portion 16.

Fuselage 12 can be formed using an all metal configuration, or from a combination of metal, wood, composite materials, and fabric. Preferably, fuselage 12 is formed from a welded steel tube frame covered with a fabric skin. This fabric skin can be formed from Dacron and finished with Nitrate and Butyrate dopes. Preferably, however, the fabric skin is a carbon fiber material.

First engine 18 is disposed within nose portion 14. First engine 18 can be a turbine or preferably a piston engine. In the preferred embodiment, first engine 18 has a flat configuration wherein its dimension parallel to long axis 70 is greater than the other two dimensions orthogonal to long axis 70. First engine 18 has 4, or preferably 6, horizontally opposed cylinders. First engine 18 develops between about 150 and about 350 horsepower, preferably between about 250 horsepower and about 350 horsepower. First engine 18 can be either air cooled or liquid cooled. For weight considerations, first engine 18 is preferably air cooled. First engine 18 is tightly cowled to minimize drag.

In the preferred embodiments, first propeller 20 connects to, and is driven by, first engine 18. First propeller 20 can have 2 blades, preferably has 3 blades, and most preferably has 4 blades. In any one of these propeller embodiments, the pitch of the propeller blades can be varied by pilot input.

Second engine 22 is disposed within tail portion 16 of fuselage 12. Second engine can be a turbine or preferably a piston engine. In the piston engine embodiment, second engine 22 has 4, or preferably 6, horizontally opposed cylinders. Second engine 22 develops between about 150 and about 350 horsepower, preferably between about 250 horsepower and about 350 horsepower. Second engine 22 can be either air cooled or liquid cooled. For purposes of minimizing weight, second engine 22 is preferably air cooled.

In the preferred embodiments, second propeller 24 connects to, and is driven by, second engine 22. Second propeller 24 can have 2 blades, preferably has 3 blades, and most preferably has 4 blades. In any one of these propeller embodiments, the pitch of the propeller blades can be varied by pilot input.

First engine 18 and second engine 22 are preferably either modified Lycoming IO-540 six cylinder engines, or modified Continental IO 520 six cylinder engines, having a dry weight of between about 400 pounds and about 450 pounds. These engines have a compression ratio of about 10 to 1 and are capable of producing between about 300 to about 350 horsepower.

First wing 30 connects to and extends outwardly from fuselage 12. First wing 30 has a leading edge portion 72 and a trailing edge portion 74. In addition, first wing 30 has a proximal, or inboard, portion 80 and a distal, or outboard, portion 82. First wing 30 has a swept wing configuration wherein proximal portion 80 is wider than the distal portion 82. First aileron 34 comprises the outboard portion of trailing edge 74. First aileron 34 is movably connected wing 30 and the position of first aileron 34 can be varied by pilot input.

Second wing 32 connects to and extends outwardly from fuselage 12. Second wing 32 has a leading edge portion 76 and a trailing edge portion 78. In addition, first wing 30 has a proximal, or inboard, portion 84 and a distal, or outboard, portion 86. Second wing 32 has a swept wing configuration wherein proximal portion 84 is wider than the distal portion 86. Second aileron 36 comprises the outboard portion of trailing edge 78. Second aileron 36 is movably connected wing 32, and the position of second aileron 36 can be varied by pilot input.

First wing 30 and second wing 36 are symmetrical, and have a total wingspan of between about 15 and about 30 feet, and an area of between about 75 square feet and about 150 square feet. The dry weight of the aircraft is between about 1000 pounds and about 1600 pounds, resulting in a wing loading of between about 10.5 and about 14.0 pounds per square foot. Applicant's aerobatic aircraft has a power loading of between about 2.3 and about 3.3 pounds per horsepower.

First end 90 of member 40 connects to trailing edge portion 74 of first wing 30. Member 40 extends rearward from trailing edge 74, and second end 92 of member 40 connects to first horizontal stabilizer 46.

First end 94 of member 42 connects to trailing edge portion 78 of second wing 32. Member 42 extends rearward from trailing edge 78, and second end 96 of member 42 connects to second horizontal stabilizer 48.

Figure 2:
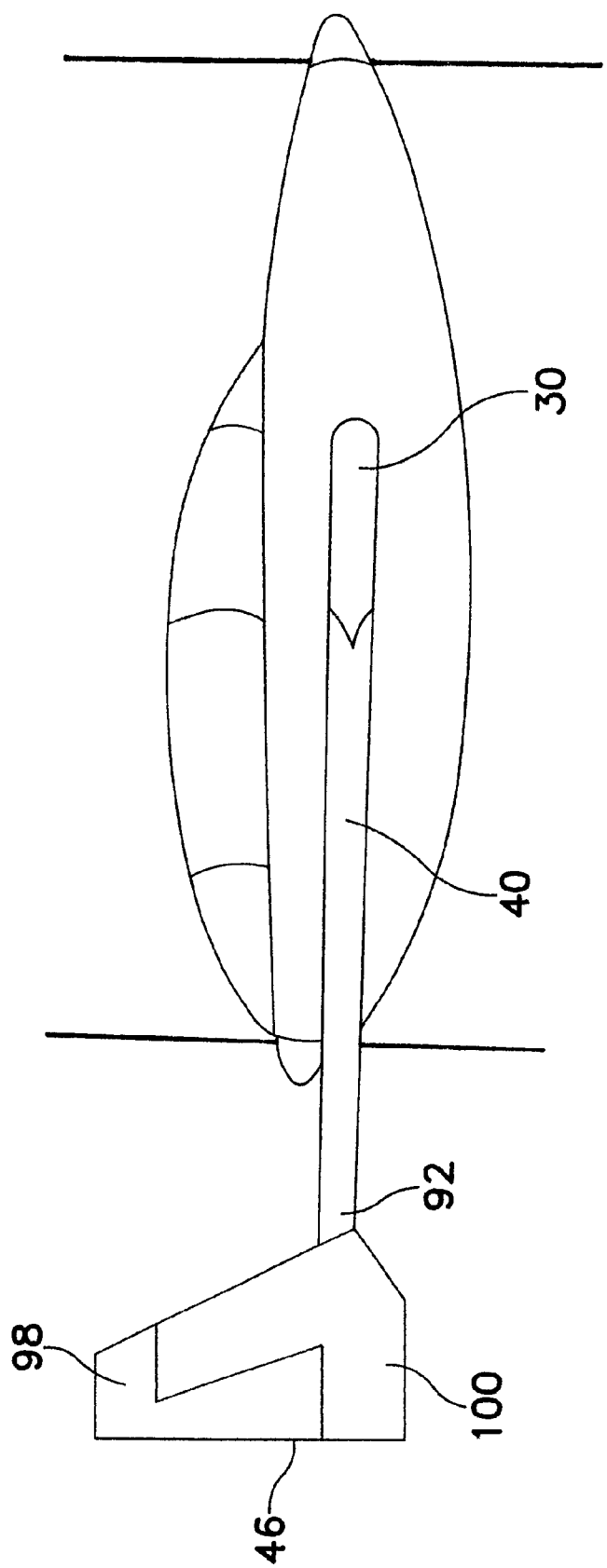
FIG. 2 is a first side view of Applicant's invention.

Referring to FIG. 2, first horizontal stabilizer 46 is formed from movable portion 98 and stationary portion 100. Second end 92 of member 40 connects to stationary portion 54. Movable portion 98 is movably attached to stationery portion 100, and the position of movable portion 98 can be varied by pilot input.

Figure 3:
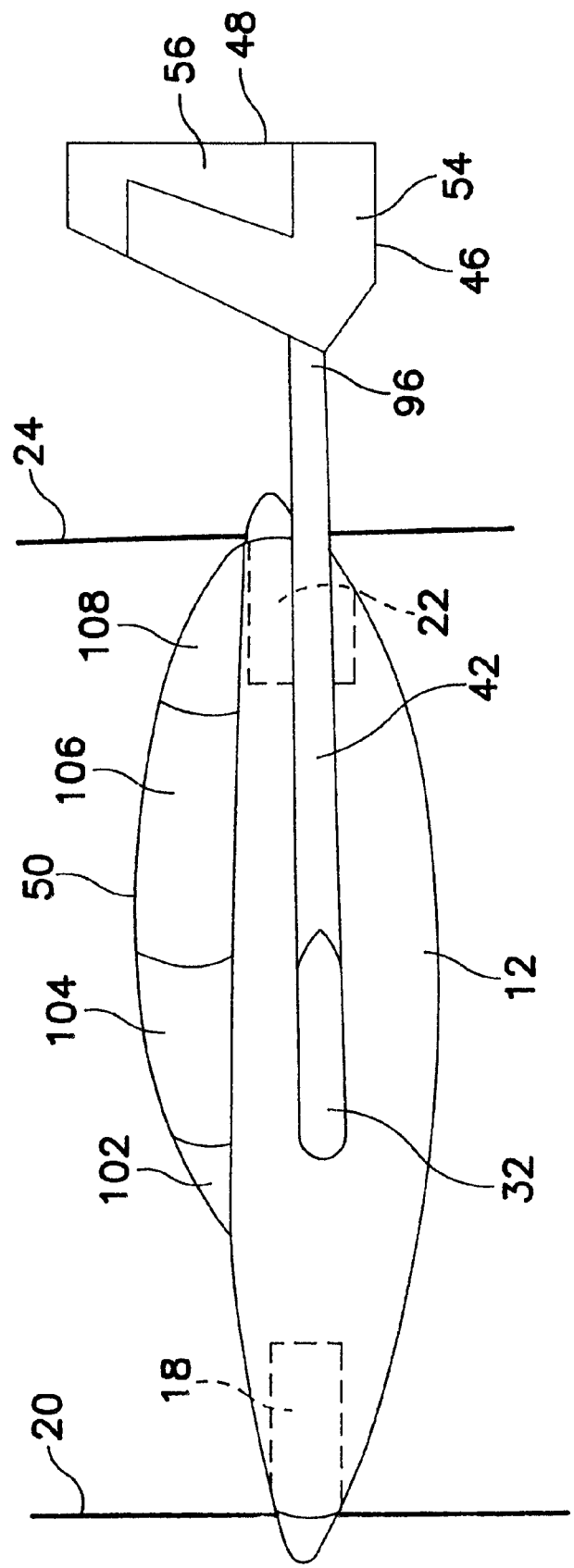
FIG. 3 is a second side view of Applicant's invention.
Figure 7:
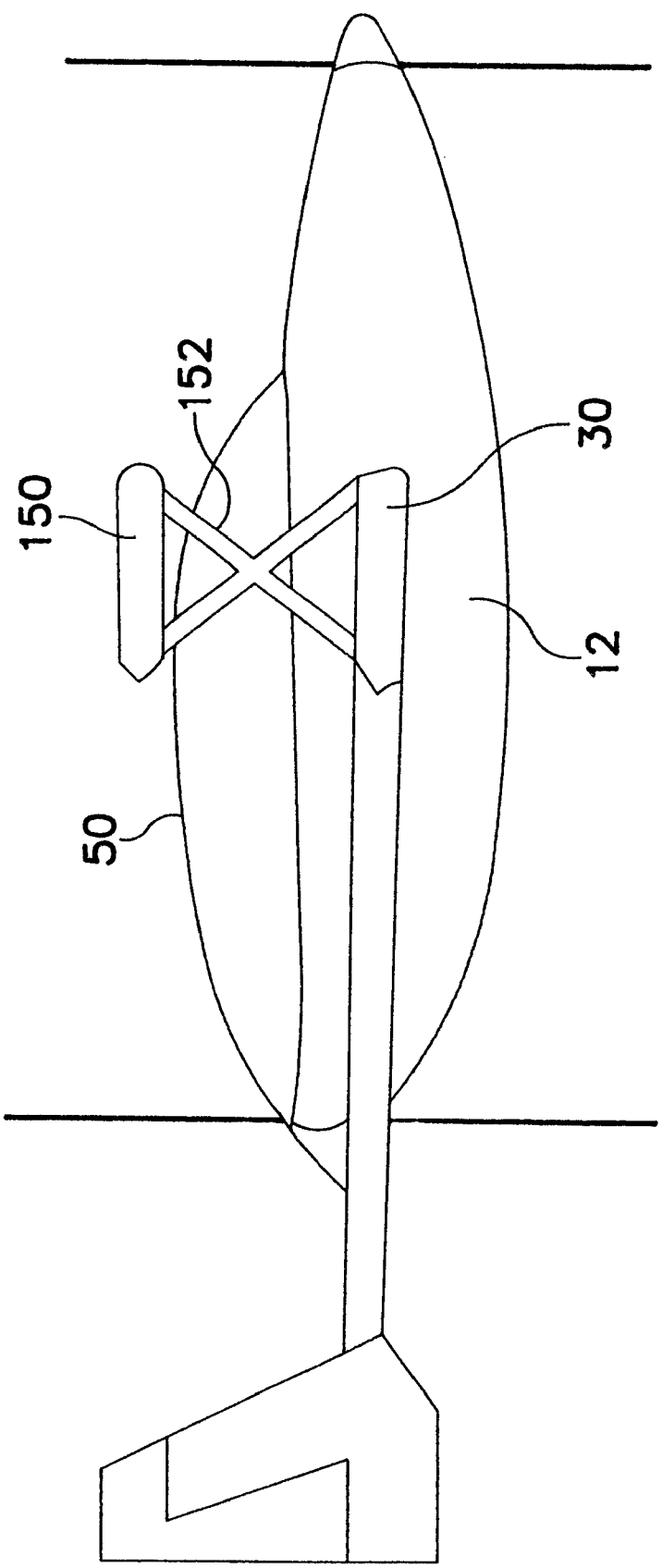
FIG. 7 is a side view of a biwing embodiment of Applicant's invention.

Referring to FIG. 3, second horizontal stabilizer 48 is from movable portion 56 and stationery portion 54. Second end 96 of member 42 connects to stationary portion 54. Movable portion 56 is movably attached to stationary portion 54, and the position of movable portion 56 can be varied by pilot input. Canopy 50 connects to the superior aspect of fuselage 12. Canopy 50 can be formed in a single unit, or optionally is formed from portions 102, 104, 106, and 108. If formed as a single unit, canopy 50 is either pivotally attached to fuselage 12 such that canopy 50 can pivot along one side to allow ingress and egress. In the alternative, canopy 50 can be slidingly attached to fuselage 12 such that canopy 50 can slide rearward to allow ingress and egress. If formed in multiple portions, then at least portion 104 is either pivotally or slidingly attached to fuselage 12. In either the single unit or the multiple portion embodiments, canopy 50 is formed from an impact-resistant transparent material, including polycarbonate, polymethylmethacrylate, or laminates of same with glass. Referring to FIG. 7, in a separate embodiment Applicant's aircraft utilizes a biwing configuration. In this embodiment, top wing 150 is connected to, and disposed above both canopy 50 and first wing 30 and second wing 32 (not shown in FIG. 7). Top wing 150 is a single assembly and has the same wing span as does the combination of first wing 30 and second wing 32. Strut assembly 152 is disposed on the distal portion of first wing 30 and connects top wing 150 to first wing 30. A similar strut assembly not shown in FIG. 7 is disposed on the distal portion of second wing 32 and connects top wing 150 to second wing 32.

Referring again to FIG. 1, in either the single wing or biwing embodiments the length of the blades comprising second propeller 24 is adjusted to fit within the space between first member 40 and second member 42. Elevator 44 has a first end 102 and a second end 104. First end 102 is movably connected to first horizontal stabilizer 46. Second end 104 is movably connected to second horizontal stabilizer 48. The position of elevator 44 can be varied by pilot input.

Applicant's invention includes an oil system which provides an uninterrupted supply of oil to both first engine 18 and second engine 22 during aerobatic maneuvers of the aircraft. Such an oil system is described in U.S. Pat. No. 4,531,358 which is hereby incorporated by reference. In conventional oil supply systems, oil starvation occurs when the aircraft takes up an inverted attitude because the oil in the oil tank falls away from the pump inlet preventing the oil pump from supplying oil to the engine. Two potentially catastrophic effects can occur. First, engine components can fail due to the lack of lubrication. Second, the cooling effect of the circulating oil is removed resulting in greatly increased engine temperatures which can lead to an oil fire when the normal flow of oil resumes.

Figure 6:
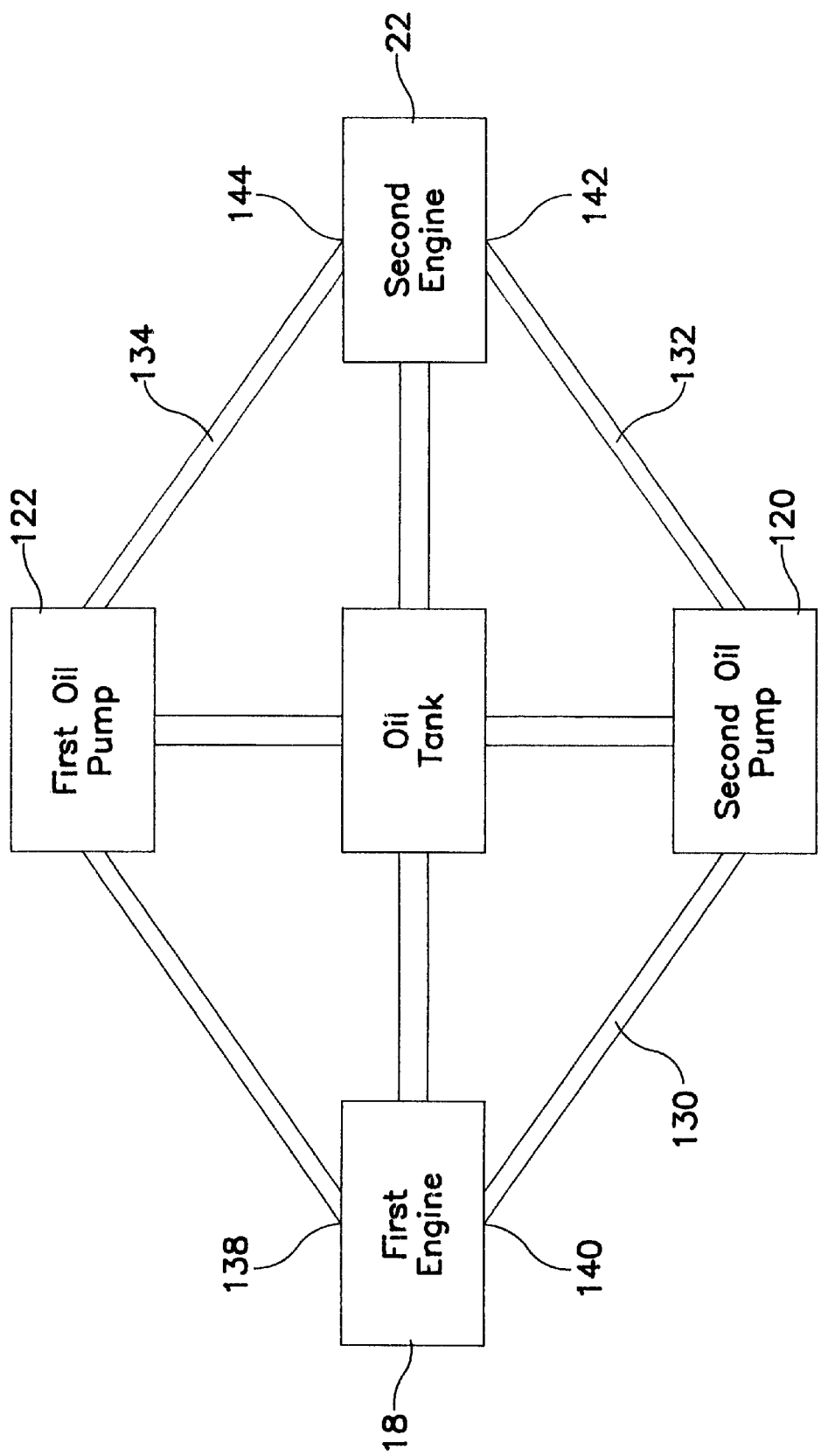
FIG. 6 is a generalized view of the components of the oil system used in Applicant's invention, and how those components are connected to one another.

Referring to FIG. 6, Applicant's invention includes a first oil supply system which includes first oil pump 122 connected to oil tank 124, such that first oil pump 122 circulates oil to first engine 18 via first oil inlet 138. Similarly, first oil pump 122 is connected to second engine 22 via first oil inlet 144. The oil pump of choice is a gear pump. First oil pump 122 supplies oil to both engines when the aircraft is in a first, i.e. upright, position.

In addition, Applicant's invention includes second oil pump 120 connected to oil tank 124 such that second oil pump 120 circulates oil to first engine 18 via second oil inlet 140. Second oil inlet 140 may be in any area of first engine 18, preferably opposite first oil inlet 138 both axially and circumferentially so that the oil in the engine automatically migrates to second oil inlet 140 when the aircraft maneuvers so as to take the oil away from first oil inlet 138. Similarly, second oil pump 120 is connected to second engine 22 via second oil inlet 142. Second oil inlet 142 may be in any area of second engine 22, preferably opposite first oil inlet 144 both axially and circumferentially so that the oil in the engine automatically migrates to second oil inlet 142 when the aircraft maneuvers so as to take the oil away from first oil inlet 144. Second oil pump 120 supplies oil to both engines when the aircraft is in a second, i.e. inverted, position.

In a separate embodiment, Applicant's aircraft includes a separate oil system for each engine. Each of these two oil systems includes two oil pumps, and is configured as discussed above with the exception that each oil system only supplies oil to one of the two engines.

Figure 4:
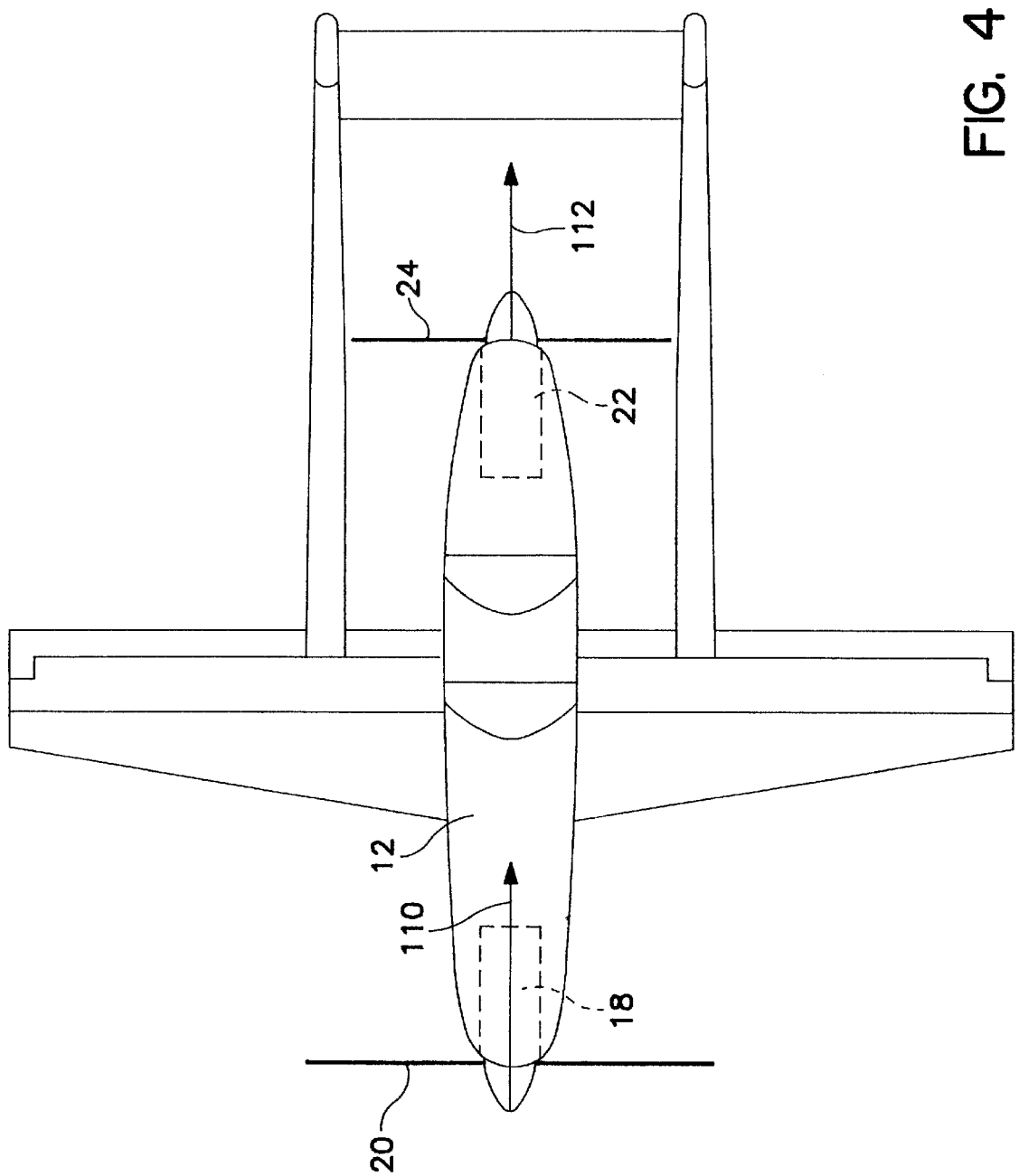
FIG. 4 is a perspective view depicting the two thrust components of Applicant's invention.

Referring to FIG. 4, first engine 18 produces first thrust component 110. Second engine 22 produces second thrust component 112. First engine 18 and second engine 22 are disposed within fuselage 12 such that first thrust component 110 and second thrust 13 component 112 are coaxial along long axis 70. As those skilled in the art will appreciate, first thrust component 110 and second thrust component 112 are vectors, each of which can be characterized by both direction and magnitude. First thrust component 110 and second thrust component 112 are symmetrical about long axis 70.

Figure 5:
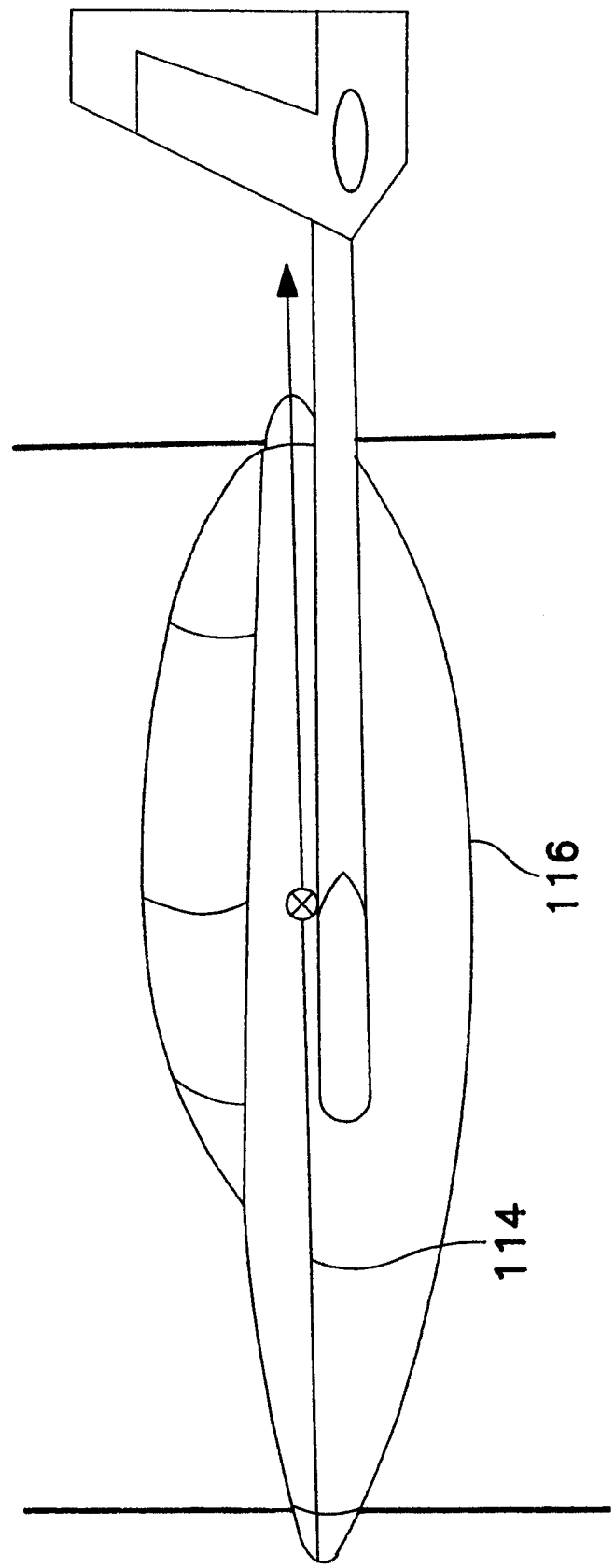
FIG. 5 is a perspective view showing the aggregate thrust component and center of gravity of Applicant's invention.

FIG. 5 depicts aggregate thrust component 114 which comprises the vector addition of first thrust component 110 and second thrust component 112. Aggregate thrust component 114 is also symmetrical about long axis 70. Because first thrust component 110 and second thrust component 112 are coaxial, aggregate thrust component 114 has the identical vector direction as do first thrust component 110 and second thrust component 112 individually. In a separate embodiment, aggregate thrust component 114 also passes directly through center of gravity point 116.

Either first engine 18 or second engine 22 individually provide sufficient power to allow aircraft 10 to takeoff, maintain altitude, and/or land safely. In the event either first engine 18 or second engine 22 should fail during an acrobatic maneuver, there will be change in the direction of the aircraft's remaining thrust component. Thus, control of the aircraft during an aerobatic maneuver will not be diminished because of an engine failure. Moreover, because the remaining engine has sufficient power to safely complete the acrobatic maneuver in progress, Applicant's invention provides a measure of safety heretofore unavailable to both acrobatic pilots and spectators.

I claim:

1. An aerobatic aircraft, comprising:
   a fuselage having a nose portion and a tail portion and a long axis running from said nose portion to said tail portion;
   a first engine disposed in said nose portion of said fuselage, wherein said first engine produces a first thrust component;
   a second engine disposed in said tail portion of said fuselage, wherein said second engine produces a second thrust component;
   wherein said first thrust component and said second thrust component are coaxial along the long axis of said fuselage;
   wherein said acrobatic aircraft can be operated at up to about +/−10 g's; and
   wherein said aerobatic aircraft has a power loading between about 2.3 pounds per horsepower and about 3.3 pounds per horsepower.

2. The acrobatic aircraft of claim 1, further comprising:
   a first propeller attached to and driven by said first engine, wherein said first propeller produces said first thrust component;
   a second propeller attached to and driven by said second engine, wherein said second propeller produces said second thrust component.

3. The acrobatic aircraft of claim 2, wherein said first engine and said second engine are piston engines.

4. The aerobatic aircraft of claim 2, wherein said first engine and said second engine are turbine engines.

5. The acrobatic aircraft of claim 1, wherein said first engine and said second engine are turbine engines.

6. The acrobatic aircraft of claim 1, wherein the composite thrust vector produced by said first thrust component and said second thrust component passes through the aircraft's center of gravity.

7. The acrobatic aircraft of claim 1, further comprising:
   a first wing connected to said fuselage, wherein said first wing further comprises a first movably mounted aileron on its trailing edge;
   a second wing connected to said fuselage, wherein said second wing further comprises a second movably mounted aileron on its trailing edge;
   a movable elevator having a first end and a second end;
   a first horizontal stabilizer, wherein said first horizontal stabilizer begins as a rearward extension of said first wing inboard of said first aileron, said first horizontal stabilizer extending aft of said fuselage and ending flush with said first end of said elevator, wherein said first end of said elevator is movably mounted to said first horizontal stabilizer;
   a second horizontal stabilizer, wherein said second horizontal stabilizer begins as a rearward extension of said first wing inboard of said first aileron, said second horizontal stabilizer extending aft of said fuselage and ending flush with said second end of said elevator, wherein said second end of said elevator is movably mounted to said second horizontal stabilizer.

8. The acrobatic aircraft of claim 7, further comprising an oil supply system for use with said first engine and said second engine, wherein said oil system supplies oil to both said first engine and said second engine when said aircraft is in either an upright or in an inverted position.

9. The aerobatic aircraft of claim 8, wherein said oil system comprises two oil pumps.

10. The aerobatic aircraft of claim 7, further comprising a first oil system and a second oil system, wherein said first oil system supplies oil to said first engine when said aircraft is in either an upright or in an inverted position, and wherein said second oil system supplies oil to said second engine when said aircraft is in either an upright or in an inverted position.

11. The aerobatic aircraft of claim 7, wherein said first engine generates between about 150 horsepower and about 350 horsepower, and said second engine generates between about 150 horsepower and about 350 horsepower.

12. The aerobatic aircraft of claim 11, wherein said first engine and said second engine generate about the same horsepower.

13. The aerobatic aircraft of claim 11, wherein said second engine generates more horsepower than does said first engine.

14. The aerobatic aircraft of claim 11, wherein said first engine and said second engine are air cooled.

15. The acrobatic aircraft of claim 11, wherein said first engine is air cooled and wherein said second engine is liquid cooled.

16. The aerobatic aircraft of claim 1, wherein said aircraft has a wing loading of between about 10.5 pounds per square foot and about 14.0 pounds per square foot.

17. The acrobatic aircraft of claim 7, further comprising a top wing, wherein said top wing is disposed above and is connected to said first wing and said second wing.

* * * * *